United States Patent
Yoshida et al.

(10) Patent No.: US 11,193,757 B2
(45) Date of Patent: Dec. 7, 2021

(54) IMAGE PICK-UP DEVICE, IMAGE MEASUREMENT APPARATUS, NON-CONTACT DISPLACEMENT-DETECTING DEVICE AND NON-CONTACT PROFILE-MEASURING DEVICE

(71) Applicant: MITUTOYO CORPORATION, Kanagawa (JP)

(72) Inventors: Satoru Yoshida, Kanagawa (JP); Tatsuya Nagahama, Kanagawa (JP); Masafumi Yamanaka, Kanagawa (JP); Hitoshi Isobe, Kanagawa (JP); Naoto Oita, Tokyo (JP); Koji Kubo, Tokyo (JP); Yuko Shishido, Kanagawa (JP); Nobuo Ohba, Kanagawa (JP); Takahisa Ootake, Kanagawa (JP); Hiroki Matsui, Kanagawa (JP); Masanori Arai, Kanagawa (JP); Shiro Igasaki, Kanagawa (JP); Yuki Kurahashi, Tokyo (JP); Hiroshi Sakai, Kanagawa (JP); Yutaka Watanabe, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/717,320

(22) Filed: Dec. 17, 2019

(65) Prior Publication Data
US 2020/0208965 A1 Jul. 2, 2020

(30) Foreign Application Priority Data
Dec. 28, 2018 (JP) ............................. JP2018-247506

(51) Int. Cl.
*G01B 11/24* (2006.01)
*H04N 5/225* (2006.01)
*G02B 21/36* (2006.01)

(52) U.S. Cl.
CPC ............ *G01B 11/24* (2013.01); *G02B 21/365* (2013.01); *H04N 5/2254* (2013.01)

(58) Field of Classification Search
None
See application file for complete search history.

(56) References Cited

U.S. PATENT DOCUMENTS 8,587,772 B2 11/2013 Sesko et al.
2010/0177376 A1* 7/2010 Arnold .................. G02B 7/023
359/307

(Continued)

FOREIGN PATENT DOCUMENTS

JP 5202966 B2 6/2013
JP 6001440 B2 10/2016

(Continued)

Primary Examiner — Kaitlin A Retallick
(74) Attorney, Agent, or Firm — Greenblum & Bernstein, P.L.C.

(57) ABSTRACT

An image measurement apparatus, which functions as a non-contact profile-measuring device, includes: an image sensor as an image pick-up device; a variable focal length lens (liquid lens unit) disposed on an optical axis extending from a workpiece to the image sensor; and a controller (image-pickup lens controller and image measurement processor) configured to control the variable focal length lens and process a detected image by the image sensor. The image measurement apparatus, which also functions as a non-contact displacement-detecting device, includes: an image sensor; a variable focal length lens (liquid lens unit) disposed on an optical axis extending from the workpiece to the image sensor; and a controller (displacement-detection (Continued)

lens controller and profile measurement processor) configured to control the variable focal length lens and a detected image by the image sensor.

2 Claims, 5 Drawing Sheets

(56) References Cited

U.S. PATENT DOCUMENTS

| | | |
|---|---|---|
| 2017/0285318 A1* | 10/2017 | Cho ..................... G02B 21/361 |
| 2017/0330340 A1 | 11/2017 | Watanabe et al. |
| 2018/0180774 A1 | 6/2018 | Nagahama et al. |
| 2018/0314033 A1 | 11/2018 | Sakai et al. |
| 2018/0314041 A1 | 11/2018 | Igasaki et al. |
| 2018/0314042 A1 | 11/2018 | Igasaki et al. |
| 2018/0340773 A1* | 11/2018 | Ueki ..................... G06T 7/0004 |
| 2019/0121056 A1 | 4/2019 | Nagahama et al. |
| 2020/0041757 A1 | 2/2020 | Kubo |
| 2020/0073024 A1 | 3/2020 | Igasaki et al. |
| 2020/0073025 A1 | 3/2020 | Igasaki et al. |

FOREIGN PATENT DOCUMENTS

| | | |
|---|---|---|
| JP | 2017-207481 A | 11/2017 |
| JP | 2018-189702 A | 11/2018 |

* cited by examiner

IMAGE PICK-UP DEVICE, IMAGE MEASUREMENT APPARATUS, NON-CONTACT DISPLACEMENT-DETECTING DEVICE AND NON-CONTACT PROFILE-MEASURING DEVICE

The entire disclosure of Japanese Patent Application No. 2018-247506 filed Dec. 28, 2018 is expressly incorporated by reference herein.

TECHNICAL FIELD

The present invention relates to an image pick-up device, an image measurement apparatus, a non-contact displacement-detecting device, and a non-contact profile-measuring device.

BACKGROUND ART

There has been used an image measurement apparatus configured to measure a profile and a dimension of a workpiece on a basis of image data of the workpiece (see Patent Literature 1: JP Patent No. 5202966).

The image measurement apparatus includes an image pick-up device including: an image sensor configured to detect an image of a workpiece through an optical device (e.g., objective lens); a movement mechanism configured to relatively move the image sensor and the workpiece in an optical axis direction; and a controller configured to process the detected image and control the movement mechanism.

Such an image pick-up device has an autofocus function (AF function) for detecting an in-focus image through contrast comparison from a plurality of images detected by scanning the workpiece in the optical axis direction while moving the movement mechanism through a controller.

Some of the image measurement apparatus, which include a non-contact displacement-detecting device configured to detect displacement of a workpiece surface in addition to the above-described image pick-up device, have been known for also functioning as a non-contact profile-measuring device capable of measuring a 3D profile of the workpiece surface.

The non-contact displacement-detecting device includes the same image sensor, movement mechanism and controller as those of the image pick-up device, the controller further being capable of detecting a height of the workpiece surface from the detected image. In order to detect the height of the workpiece surface, for instance, a focal point detection method (PFF) of detecting a focal point in taking an image of the workpiece and a white-light interference method (WLI) of detecting the workpiece surface on a basis of an interference fringe of white light are used (see Patent Literature 2: JP 2017-207481A).

The non-contact profile-measuring device can measure the 3D profile of the workpiece surface by sequentially or continuously measuring the height of the workpiece surface using the above-described non-contact displacement-detecting device.

The non-contact profile-measuring device employs, as the AF function during the measurement, a laser beam autofocus method (LAF) using laser beam and a tracking autofocus method (TAF) in which the non-contact profile-measuring device is moved along a predetermined route. Further, a non-contact displacement-detecting device with higher accuracy is a chromatic point sensor method (CPS) (see Patent Literature 3: JP Patent No. 6001440).

In the above-described image measurement apparatus, image pick-up device, non-contact displacement-detecting device, and non-contact profile-measuring device, a single-focus optical system is used basically and the AF function accompanied with a movement of a lens in an optical axis direction is used for focusing control. However, in recent years, a liquid lens system for vibrating a transparent liquid at a high frequency has been developed as a variable focal length lens capable of taking multi-focus images (see Patent Literature 4: JP 2018-189702A).

The liquid lens system is provided by immersing a cylindrical vibrator formed of a piezoelectric material in a transparent liquid. In the liquid lens system, when AC voltage is applied to an inner circumferential surface and an outer circumferential surface of the vibrator, the vibrator expands or shrinks in its thickness direction to vibrate a liquid inside the vibrator. When a frequency of the applied voltage is adjusted depending on a natural frequency of the liquid, a concentric standing wave is formed in the liquid, whereby concentric regions having different refractive indexes are formed around a central axis of the vibrator. In this state, when light passes along the central axis of the vibrator, this light diffuses or focuses according to the refractive indexes of the respective concentric regions.

The variable focal length lens is in a form of a package of a liquid lens unit including the above-described liquid lens system and an objective lens (e.g., a typical convex lens or lens group) for focusing light, the liquid lens system and the objective lens being arranged on a common optical axis. The variable focal length lens is installed in an optical system of various devices.

When parallel rays of light enter a typical objective lens, the light passing through the lens is focused on a focal point that is present at a predetermined focal length. In contrast, when parallel rays of light enter the liquid lens system arranged coaxially with the objective lens, the parallel rays of light diffuse or focus through the liquid lens system, so that the parallel rays of light having passed through the objective lens are focused on a point remoter from or closer to an original focal point (i.e., a focal point without using the liquid lens system).

Accordingly, by applying a drive signal (i.e., AC voltage at a frequency to generate a standing wave in a liquid described herein), which is inputted to the liquid lens system, to the variable focal length lens and increasing or decreasing an amplitude of the drive signal, the focal point is controllable as needed within a predetermined range (i.e., a predetermined width for the focal point to be varied and that can be increased or decreased by the liquid lens system with reference to the focal length of the objective lens).

In the variable focal length lens, for instance, a sinusoidal AC signal is used as the drive signal to be inputted to the liquid lens system. When such a drive signal is inputted, the focal length (focal point) of the variable focal length lens sinusoidally changes. At this time, when the amplitude of the drive signal is zero, light passing through the liquid lens system is not refracted. Accordingly, the focal length of the variable focal length lens becomes equal to the focal length of the objective lens. When the amplitude of the drive signal is at positive and negative peaks, light passing through the liquid lens system is refracted most sharply. Accordingly, the focal length of the variable focal length lens is remotest from the focal length of the objective lens.

In order to acquire images using the above variable focal length lens, a pulsed illumination of outputting an illumination signal synchronized with a phase of the sinusoidal drive signal is used. When the pulsed illumination is conducted focusing on a predetermined focal length among the sinusoidally changing focal lengths, an image present at the predetermined focal length is detected. If the pulsed illumination is conducted at a plurality of phases in one cycle and images are detected at the respective phases, the images at a plurality of focal lengths can be simultaneously obtained.

The above-described image pick-up device, image measurement apparatus, non-contact displacement-detecting device, and non-contact profile-measuring device, which determine a focal point from contrast values with respect to a plurality of detected images obtained by scanning in an optical axis direction as the AF function, require a mechanical movement mechanism of an image sensor for scanning. For this reason, the image measurement apparatus becomes complicated in structure, requires an installation space, and requires a long time for operation to deteriorate an operating efficiency.

SUMMARY OF THE INVENTION

An object of the invention is to provide an image pick-up device, an image measurement apparatus, a non-contact displacement-detecting device, and a non-contact profile-measuring device each having a simple and small-sized structure and being capable of efficiently bringing an image of a target into focus in a short time.

An image pick-up device according to an aspect of the invention includes: an image sensor configured to detect an image of a workpiece; a variable focal length lens disposed on an optical path extending from the workpiece to the image sensor; and a controller configured to control the variable focal length lens and process the image detected by the image sensor.

In the above aspect of the invention, since the variable focal length lens is used in the image pick-up device, the detected images are in a form of multi-focus images superimposed on each other, so that an in-focus image is selectable from the detected images. Accordingly, a typical AF mechanism is omittable in image pickup, so that the operation speed is improvable.

The image pick-up device of the invention is applicable to a microscope for measuring a micro workpiece, a monitor of a micro-profile measurement system using a micro stylus, a hardness measuring machine, or in-line inspection in a manufacturing process, in addition to the installation in an image measurement apparatus and an image inspection device.

An image measurement apparatus according to another aspect of the invention includes: the image pick-up device according to the above aspect of the invention; a stage on which the workpiece is placed; and a display device configured to display the image detected by the image sensor on the display device.

By using the image pick-up device in the above arrangement, a typical AF mechanism is omittable in displacement detection, so that the operation speed is improvable.

The image measurement apparatus is not necessarily used for a large workpiece in a so-called image inspection device. For instance, in some embodiments, the image measurement apparatus is applied to a microscope for measuring a micro workpiece, a monitor of a micro-profile measurement system using a micro stylus, a hardness measuring machine, or in-line inspection in a manufacturing process.

A non-contact displacement-detecting device according to a still another aspect of the invention includes: an image sensor configured to detect an image of a workpiece; a variable focal length lens disposed on an optical path extending from the workpiece to the image sensor; and a controller configured to control the variable focal length lens and detect a surface position of the workpiece from the image detected by the image sensor.

In the above aspect of the invention, since the variable focal length lens is used in the non-contact displacement-detecting device, the detected images are in a form of multi-focus images superimposed on each other. The non-contact displacement-detecting device can detect coordinates of a surface of the workpiece by detecting an in-focus image from the images detected at the respective focal points, through contrast comparison and the like. Accordingly, a typical AF mechanism is omittable in displacement detection, so that the operation speed is improvable.

In the above aspect of the invention, existing PFF method and WLI method are applicable to the detection of the surface position of the workpiece.

The non-contact displacement-detecting device in the above aspect of the invention is not only installable to the non-contact profile-measuring device but also is applicable to various devices for detecting displacement of the workpiece.

A non-contact profile-measuring device according to a further aspect of the invention includes: the non-contact displacement-detecting device according to the above still another aspect of the invention; a stage on which the workpiece is placed; and a display device configured to display a detection result thereon, in which the controller is capable of measuring a surface profile of the workpiece.

In the above aspect of the invention, existing LAF method, TAF method and CPS method are applicable to the measurement of a profile of the workpiece.

By using the non-contact displacement-detecting device in the above aspect, a typical AF mechanism is omittable in displacement detection, so that the operation speed is improvable.

The non-contact displacement-detecting device in the above aspect is not necessarily used for a large workpiece, but may be used for a micro workpiece. The stage on which the workpiece is placed may be a transfer conveyer that is used, for instance, for in-line measurement in a manufacturing process.

According to the above aspects of the invention, an image pick-up device, an image measurement apparatus, a non-contact displacement-detecting device, and a non-contact profile-measuring device each having a simple and small-sized structure and being capable of efficiently bringing an image of a target into focus in a short time can be provided.

DESCRIPTION OF EMBODIMENT(S)

An exemplary embodiment of the invention will be described below with reference to the attached drawings.

Figure 1:
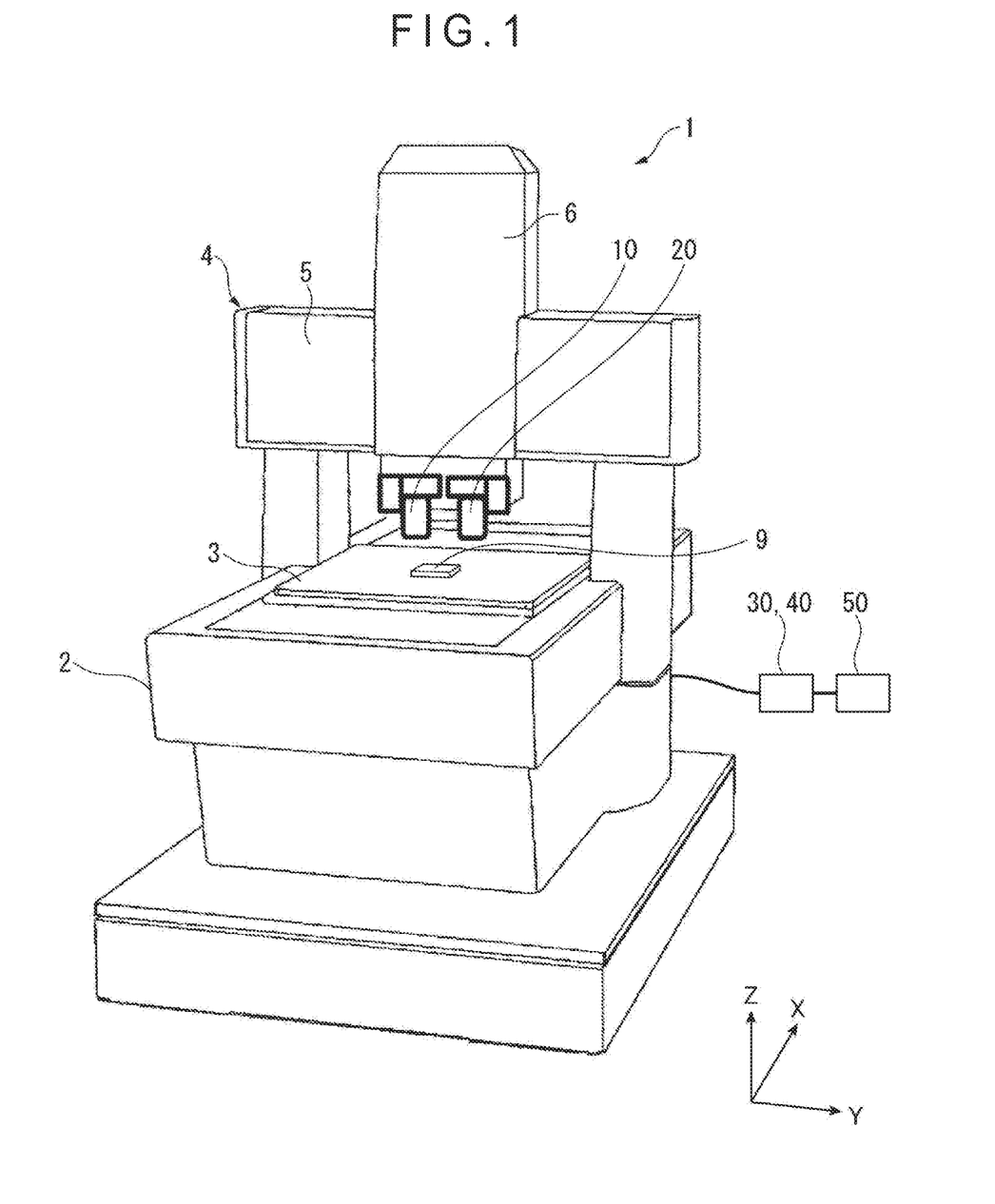
FIG. 1 is a perspective view showing an overall arrangement of an image measurement apparatus according to an exemplary embodiment of the invention.

FIG. 1 shows an overall arrangement of an image measurement apparatus 1 (non-contact coordinate measuring machine) according to the exemplary embodiment of the invention. Image Measurement Apparatus 1

The image measurement apparatus 1 includes: a base 2; and a stage 3 provided on an upper surface of the base 2 and on which a workpiece 9 is to be placed. The image measurement apparatus 1 further includes: a portal column 4 bridging the stage 3 above the base 2; a horizontal beam 5 provided to the column 4; and an elevatable head 6 supported by the horizontal beam 5. The image measurement apparatus 1 further includes: an image pickup optical head 10 and a displacement-detecting optical head 20 provided to a lower portion of the elevatable head 6.

In the image measurement apparatus 1, the stage 3 is movable in an X axis direction relative to the base 2 and the column 4, the elevatable head 6 is movable in a Y axis direction along the horizontal beam 5 relative to the stage 3, and the elevatable head 6 is elevatable in a Z axis direction relative to the horizontal beam 5 and the stage 3. The above three axial movements are correspondingly performed by movement mechanisms (not shown) that are provided inside the base 2, the horizontal beam 5, and the elevatable head 6, respectively.

Figure 2:
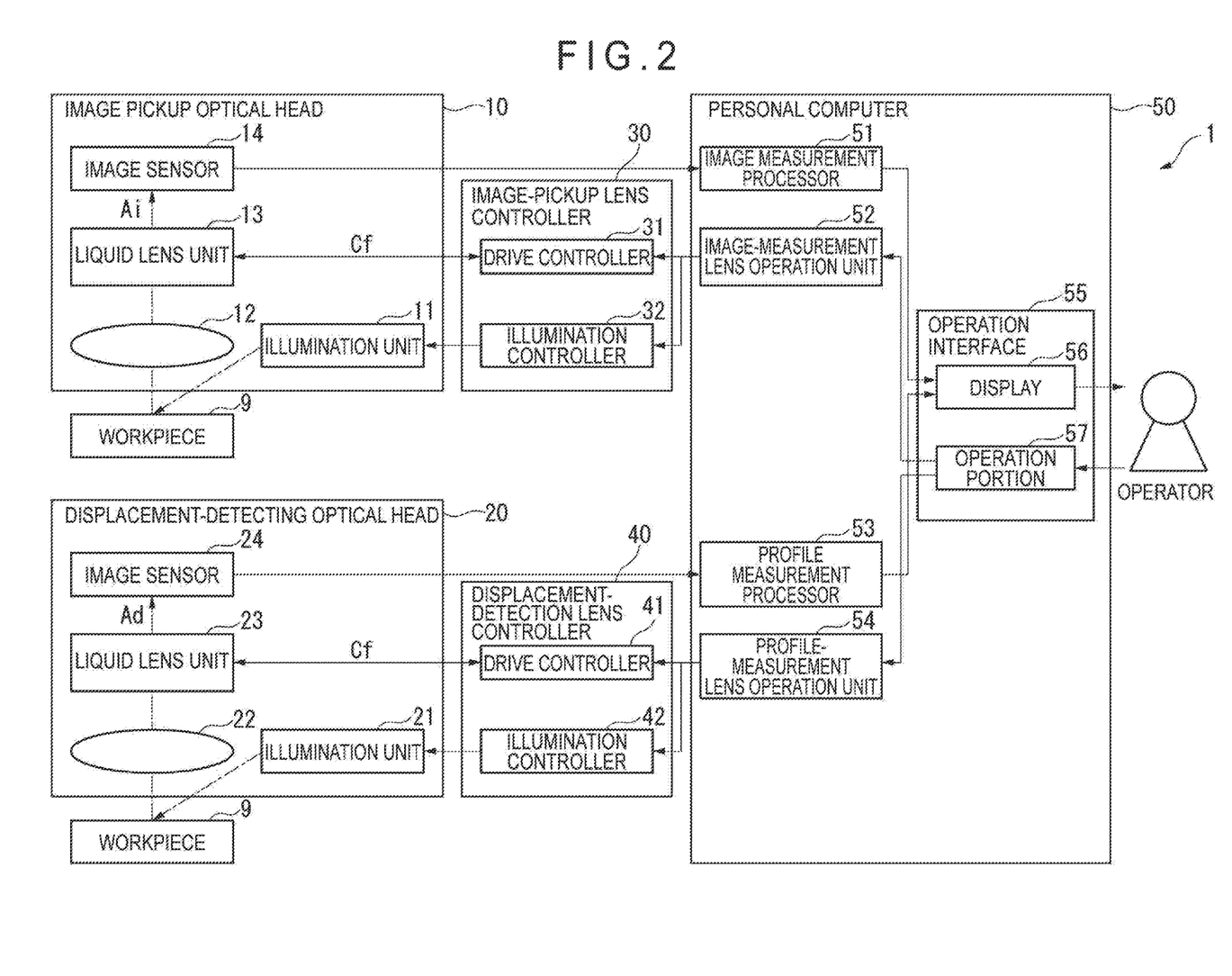
FIG. 2 is a block diagram showing a control system in the above exemplary embodiment.

As shown in FIG. 2, an image-pickup lens controller 30 is connected to the image pickup optical head 10 and is configured to control the image pickup optical head 10; a displacement-detection lens controller 40 is connected to the displacement-detecting optical head 20 and is configured to control the displacement-detecting optical head 20; and a personal computer 50 for processing a detected image and operating the entire image measurement apparatus 1 is connected to the image pickup optical head 10 and the displacement-detecting optical head 20.

In the exemplary embodiment, the image pickup optical head 10, the image-pickup lens controller 30, and the personal computer 50 define an image pick-up device of the invention. Moreover, the displacement-detecting optical head 20, the displacement-detection lens controller 40, and the personal computer 50 define a non-contact displacement-detecting device of the invention.

Image Pickup Optical Head 10

The image pickup optical head 10 includes: an illumination unit 11 configured to illuminate a workpiece 9: an objective lens 12 facing the workpiece 9; a liquid lens unit 13 disposed on an optical axis Ai of the objective lens 12; and an image sensor 14 configured to detect an image of the workpiece 9 through the objective lens 12 and the liquid lens unit 13.

The illumination unit 11 includes a transparent illumination system by a white LED, a vertical illumination system by a white LED, and a program-controlled ring illumination system by a white LED. Any one of the above illumination systems is selectable depending on an image to be taken and the nature of the workpiece 9.

The objective lens 12, which is an existing optical lens, is capable of forming an image of the workpiece 9 on an image sensor 14 through the liquid lens unit 13.

The liquid lens unit 13, which is a variable focal length lens whose focal length is variable at a high speed, has a refractive index that is variable in response to a drive signal Cf to be inputted.

The image sensor 14, which is, for instance, an existing CCD image sensor (charge-coupled device) or a camera of another type, is capable of outputting the inputted image of the workpiece 9 as a detected image in a predetermined signal form.

Liquid Lens Unit 13

Figure 3:
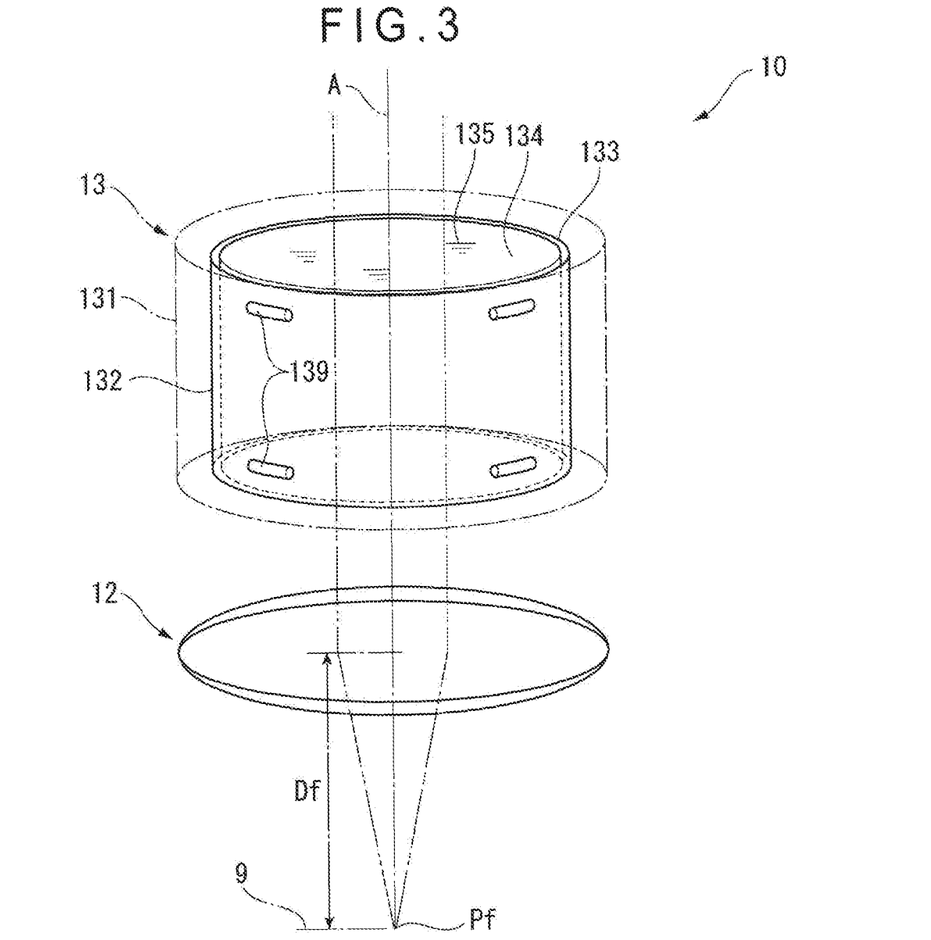
FIG. 3 is a perspective view showing an arrangement of a liquid lens unit in the above exemplary embodiment.

As shown in FIG. 3, the liquid lens unit 13 includes: a cylindrical case 131; and a cylindrical vibrator 132 inside the case 131. The vibrator 132 is supported by an elastomer-made spacer 139 interposed between an outer circumferential surface 133 of the vibrator 132 and an inner circumferential surface 134 of the case 131.

The vibrator 132, which is a cylinder formed of a piezoelectric material, vibrates in its thickness direction by being applied with AC voltage of the drive signal Cf between the outer circumferential surface 133 and the inner circumferential surface 134.

An inside of the case 131 is filled with a highly transparent liquid 135. The entire vibrator 132 is immersed in the liquid 135. An inside of the cylindrical vibrator 132 is filled with the liquid 135. The AC voltage of the drive signal Cf is adjusted to a frequency at which the liquid 135 inside the vibrator 132 generates a standing wave.

Figure 4:
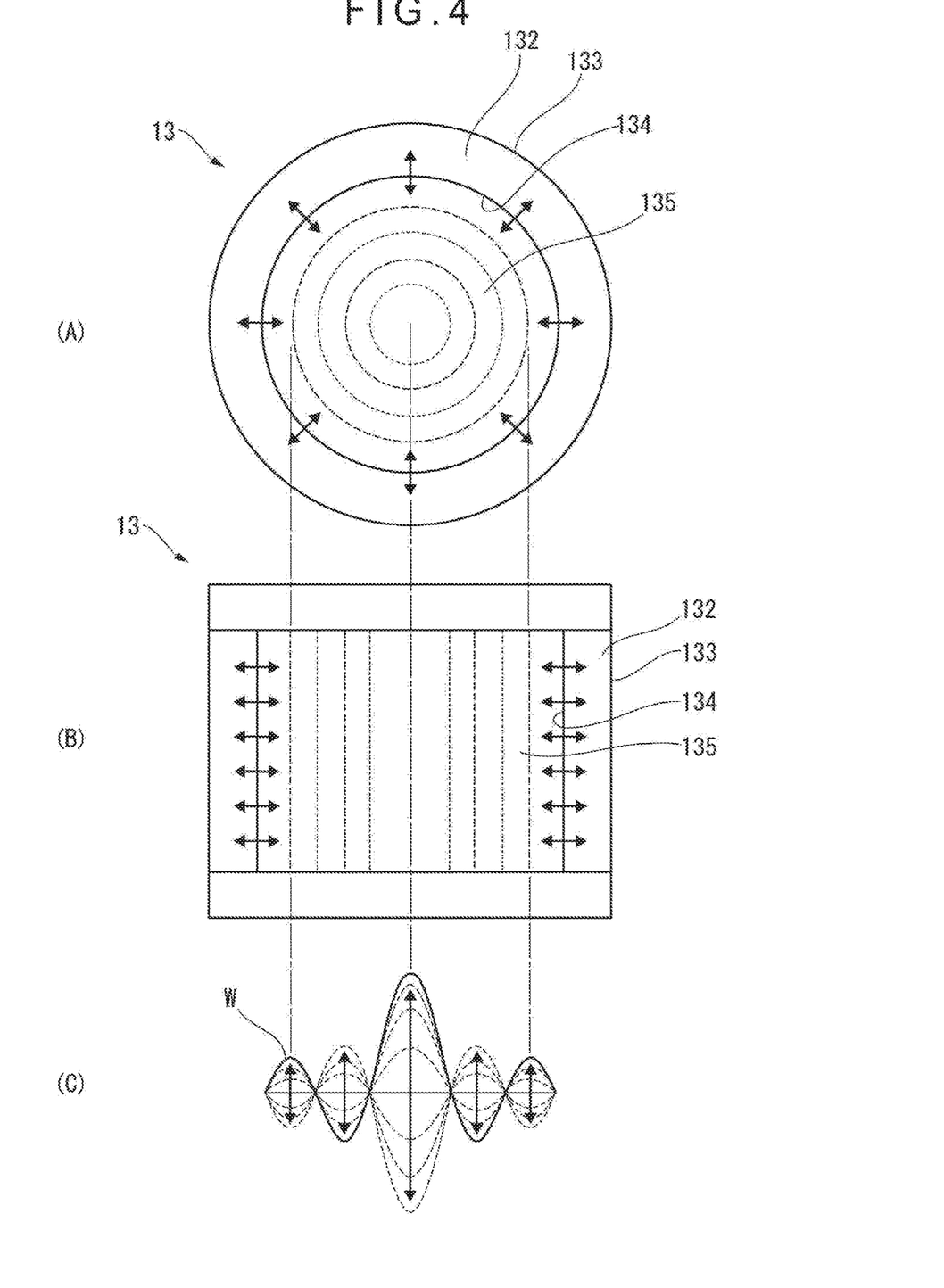
FIG. 4 schematically shows an operation of the liquid lens unit in the above exemplary embodiment.

As shown in FIG. 4, when the vibrator 132 is vibrated in the liquid lens unit 13, a standing wave is generated in the liquid 135 inside the vibrator 132 to generate concentric regions with alternating refractive indexes (see FIGS. 4(A) and 4(B)).

At this time, a relationship between a distance (radius) from a central axis line of the liquid lens unit 13 and a refractive index of the liquid 135 is shown by a refractive index distribution W shown in FIG. 4(C).

Figure 5:
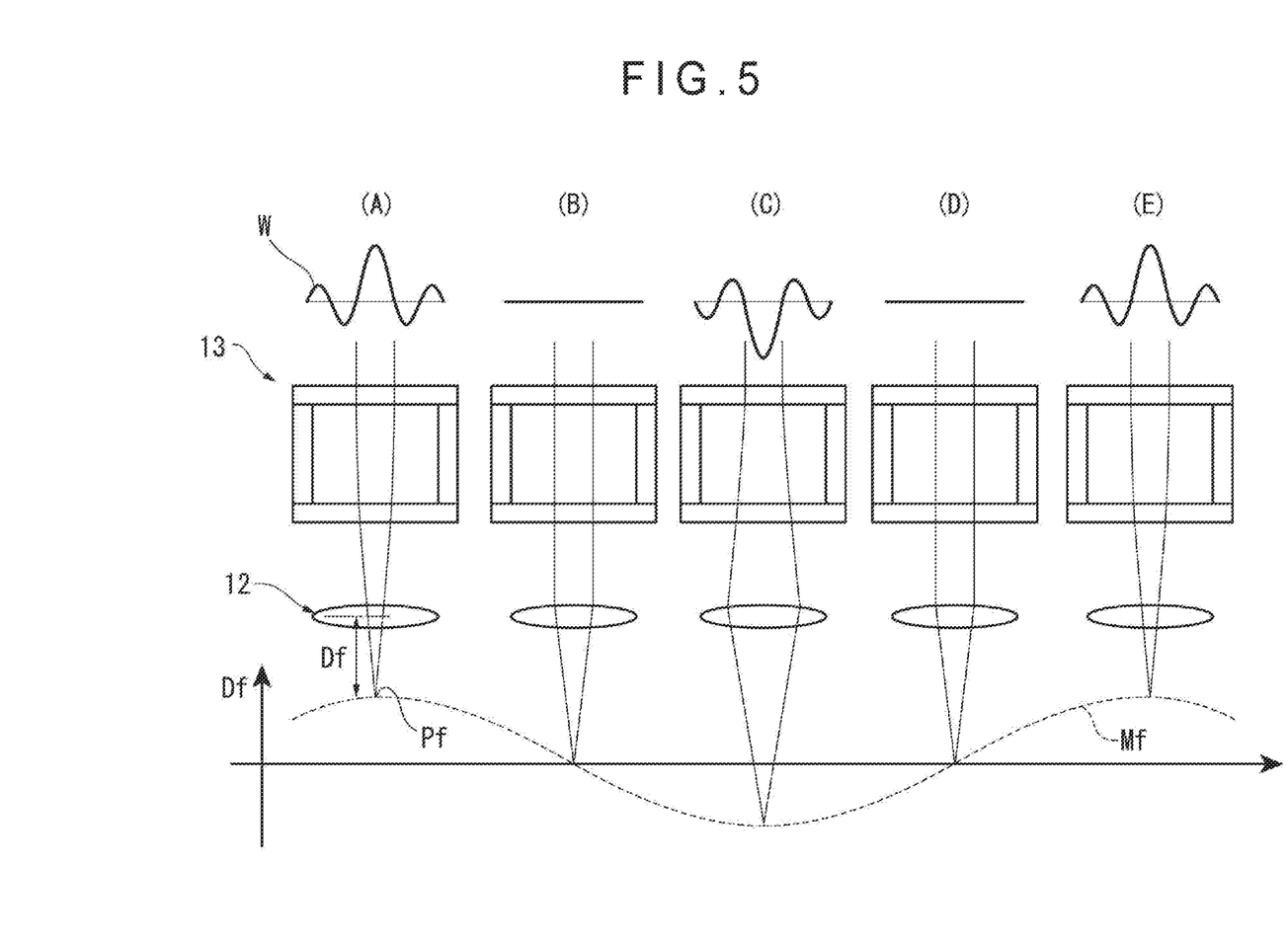
FIG. 5 schematically shows a function of the liquid lens unit in the above exemplary embodiment.

In FIG. 5, since the drive signal Cf is a sinusoidal AC signal, a variable width of the refractive index distribution W of the liquid 135 in the liquid lens unit 13 is varied depending on the AC signal. The refractive indexes of the concentric regions generated in the liquid 135 sinusoidally change, whereby the focal length Df stretching to a focal point Pf sinusoidally changes.

In a state shown in FIG. 5(A), the refractive index distribution W acquires the maximum amplitude, where the liquid lens unit 13 focuses incoming light at a near focal point Pf and at the shortest focal length Df.

In a state shown in FIG. 5(B), the refractive index distribution W becomes flat, where the incoming light goes straight through the liquid lens unit 13, showing standard values of the focal point Pf and the focal length Df.

In a state shown in FIG. 5(C), the refractive index distribution W acquires the maximum amplitude at a polarity reversed to that in FIG. 5(A), where the liquid lens unit 13 diffuses the incoming light to be focused at a remote focal point Pf and at the maximum focal length Df.

In a state shown in FIG. 5(D), the refractive index distribution W becomes flat, where the incoming light goes straight through the liquid lens unit 13, showing the standard values of the focal point Pf and the focal length Df.

In a state shown in FIG. 5(E), the refractive index distribution W returns to the state shown in FIG. 5(A). Subsequently, the same variation is repeated.

Thus, in the liquid lens unit 13, the drive signal Cf is a sinusoidal AC signal, and the focal point Pf and the focal length Df also sinusoidally changes like the focal-point-variation waveform Mf in FIG. 5.

Herein, when the illumination unit 11 conducts pulsed illumination at any phase of the focal-point-variation waveform Mf while the image sensor 14 continuously picks up images, image data of the workpiece 9 being present at the focal length Df and the focal point Pf at any illumination time can be obtained.

On the other hand, when the image sensor 14 continuously picks up images and the illumination unit 11 continuously illuminates, image data in which images of the workpiece 9 focusing on the entire range of the focal length Df are superimposed can be detected.

Referring back to FIG. 2, the displacement-detecting optical head 20, the image-pickup lens controller 30, the displacement-detection lens controller 40, and the personal computer 50 will be described.

Displacement-Detecting Optical Head 20

The displacement-detecting optical head 20 includes: an illumination unit 21 configured to illuminate the workpiece 9; an objective lens 22 facing the workpiece 9; a liquid lens unit 23 disposed on an optical axis Ad of the objective lens 22; and an image sensor 24 configured to detect an image of the workpiece 9 through the objective lens 22 and the liquid lens unit 23.

The illumination unit 21, the objective lens 22, the liquid lens unit 23, and the image sensor 24 are the same as the illumination unit 11, the objective lens 12, the liquid lens unit 13, and the image sensor 14, respectively, of the image pickup optical head 10. However, with reference to a difference in a function of the displacement detection, the displacement-detecting optical head 20 may have a partially different structure from the image pickup optical head 10.

Image-Pickup Lens Controller 30

The image-pickup lens controller 30 includes a drive controller 31 and an illumination controller 32.

The drive controller 31 is configured to drive the liquid lens unit 13 of the image pickup optical head 10 by generating the drive signal Cf under conditions specified by the personal computer 50 and applying the drive signal Cf to the liquid lens unit 13. The liquid lens unit 13 feeds back a signal showing an operating state (e.g., effective electric power value).

The illumination controller 32 is configured to control the illumination unit 11 of the image pickup optical head 10 to select an illumination system under the conditions specified by the personal computer 50 and make the illumination unit 11 give continuous illumination or pulsed illumination.

Displacement-Detection Lens Controller 40

The displacement-detection lens controller 40 includes a drive controller 41 and an illumination controller 42. The drive controller 41 and the illumination controller 42 are respectively the same as the drive controller 31 and the illumination controller 32 described above The drive controller 41 is configured to drive the liquid lens unit 23 of the displacement-detecting optical head 20 by generating the drive signal Cf under conditions specified by the personal computer 50 and applying the drive signal Cf to the liquid lens unit 23. The liquid lens unit 23 feeds back a signal showing an operating state (e.g., effective electric power value).

The illumination controller 42 is configured to control the illumination unit 21 of the displacement-detecting optical head 20 to select an illumination system under the conditions specified by the personal computer 50 and make the illumination unit 21 give continuous illumination or pulsed illumination.

Personal Computer 50

The personal computer 50 includes an image measurement processor 51, an image-measurement lens operation unit 52, a profile measurement processor 53, a profile-measurement lens operation unit 54, and an operation interface 55. Further, the operation interface 55 includes: a display 56 (display device) whose screen display is visible by a user, and an operation portion 57 to be operable by the user.

With respect to the image pickup optical head 10, the user operates the operation portion 57 to set operation conditions of the image pickup optical head 10 through the image-measurement lens operation unit 52 and send the set operation conditions to the image-pickup lens controller 30. As a result, the image-pickup lens controller 30 operates the image pickup optical head 10 under the set conditions.

In the image pickup optical head 10, the image sensor 14 detects an image of the workpiece 9 and the image measurement processor 51 process the detected image to display the detected image on the display 56.

With respect to the displacement-detecting optical head 20, the user operates the operation portion 57 to set operation conditions of the displacement-detecting optical head 20 through the profile-measurement lens operation unit 54 and send the set operation conditions to the displacement-detection lens controller 40. As a result, the displacement-detection lens controller 40 operates the displacement-detecting optical head 20 under the set conditions.

In the displacement-detecting optical head 20, the image sensor 24 detects images of the workpiece 9 and the profile measurement processor 53 detects an in-focus image from the detected images to detect a surface profile of the workpiece 9. Such a processing is exemplified by a 3D profile measurement by a focal point detection method (PFF). A progress of the processing and a detection result are displayed on the display 56.

Advantage(s) of Exemplary Embodiment(s)

The above-described exemplary embodiment produces advantages as follows.

In the exemplary embodiment, the image pickup optical head 10, the image-pickup lens controller 30, and the personal computer 50 of the image measurement apparatus 1 define an image pick-up device of the invention.

The image pick-up device includes: the image sensor 14 configured to detect the image of the workpiece 9; the variable focal length lens (the liquid lens unit 13) disposed on the optical axis Ai extending from the workpiece 9 to the image sensor 14; and the controller (the drive controller 31 and the image measurement processor 51) configured to control the variable focal length lens and process the detected image of the image sensor 14.

Since the variable focal length lens (the liquid lens unit 13) is used in such an image pick-up device, the detected images are in a form of multi-focus images superimposed on each other, so that the detected image in focus is selectable among the superimposed detected images. Accordingly, a typical AF mechanism is omittable in image pickup, so that the operation speed is improvable.

In the exemplary embodiment, the displacement-detecting optical head 20, the displacement-detection lens controller 40, and the personal computer 50 of the image measurement apparatus 1 define a non-contact displacement-detecting device of the invention.

The non-contact displacement-detecting device includes: the image sensor 24 configured to detect the image of the workpiece 9; the variable focal length lens (the liquid lens unit 23) disposed on the optical axis Ad extending from the workpiece 9 to the image sensor 24; and the controller (the drive controller 41 and the profile measurement processor 53) configured to control the variable focal length lens and detect an in-focus image from the detected images of the image sensor 24.

Since the variable focal length lens (the liquid lens unit 23) is used in such a non-contact displacement-detecting device, the detected images are in a form of multi-focus images superimposed on each other. The non-contact displacement-detecting device can detect coordinates of a surface of the workpiece 9 by detecting an in-focus image from the images detected at the respective focal lengths through contrast comparison and the like. Accordingly, a typical AF mechanism is omittable in displacement detection, so that the operation speed is improvable.

Modification(s)

It should be understood that the invention is not limited to the above-exemplified embodiment but encompasses modifications and improvements as long as an object of the invention can be achieved.

In the above exemplary embodiment, the displacement-detecting optical head 20 does not necessarily have the same structure as the image pickup optical head 10, but may have a different structure from that of the image pickup optical head 10 in order to detect displacement. For instance, in some embodiments, when the displacement-detecting optical head 20 performs not the PFF measurement but the WLI measurement, the displacement-detecting optical head 20 has a suitable structure for the WLI measurement including an interference objective lens in place of the objective lens 22 and a CCD camera and a microscope unit in place of the image sensor 24.

In the above exemplary embodiment, the personal computer 50 includes: the image measurement processor 51 for processing the detected image from the image pickup optical head 10; and the image-measurement lens operation unit 52 for operating the image-pickup lens controller 30. However, for instance, in some embodiments, in a case where the function for the image measurement is not required and the detected image is simply displayed or recorded, the personal computer 50 includes an image pickup processor in place of the image measurement processor 51 and an image-pickup lens controller in place of the image-measurement lens operation unit 52.

In the above exemplary embodiment, the personal computer 50 includes the profile measurement processor 53 for processing the detected image from the displacement-detecting optical head 20; and the profile-measurement lens operation unit 54 for operating the displacement-detection lens controller 40. However, the structure of the personal computer 50 is changeable depending on measurement details. For instance, in some embodiments, the personal computer 50 includes a displacement detection processor in place of the profile measurement processor 53 and a displacement-detection lens controller in place of the profile-measurement lens operation unit 54.

In the above exemplary embodiment, the image measurement apparatus 1 includes: the image pick-up device provided with the image pickup optical head 10; and the non-contact displacement-detecting device provided with the displacement-detecting optical head 20, so that the image measurement apparatus 1 also functions as the non-contact profile-measuring device.

However, for instance, in some embodiments, the image measurement apparatus 1 performs only one of the image measurement and the image inspection of the workpiece 9. In such a case, although the structure of the image measurement apparatus 1 functioning as the image pick-up device provided with the image pickup optical head 10 is required, the structure of the image measurement apparatus 1 functioning as the non-contact displacement-detecting device is omitted.

Moreover, the image measurement apparatus 1 is not necessarily used for a large workpiece in a so-called image inspection device. For instance, in some embodiments, the image measurement apparatus 1 is applied to a microscope for measuring a micro workpiece, a monitor of a micro-profile measurement system using a micro stylus, a hardness measuring machine, or in-line inspection in a manufacturing process.

Meanwhile, for instance, in some embodiments, the image measurement apparatus 1 performs only one of the position detection of the surface, the displacement detection and the profile measurement of the workpiece 9. In other words, the image measurement apparatus 1 is a non-contact profile-measuring device. In such a case, although the structure of the image measurement apparatus 1 functioning as the non-contact displacement-detecting device provided with the displacement-detecting optical head 20 is required, the structure of the image measurement apparatus 1 functioning as the image pick-up device is omitted.

The profile measurement by the non-contact profile-measuring device is not limited to the 3D-profile measurement, but is linear measurement or dot measurement in some embodiments. In such a case, existing LAF, TAF and CPS, or PFF and WLI are applicable to the optical structure and the image processing for the profile measurement.

Moreover, the non-contact profile-measuring device of the invention is not necessarily used for a large workpiece, but is usable for a micro workpiece in some embodiments. Further, the stage on which the workpiece is placed is not limited to the stage 3 movable within a restricted range, but may be a transfer conveyer that is used, for instance, for in-line measurement in a manufacturing process in some embodiments.

In the above exemplary embodiment, the image pickup optical head 10, the image-pickup lens controller 30, and the personal computer 50 (the image measurement processor 51 and the image-measurement lens operation unit 52) define the image pick-up device of the invention for the image measurement of the workpiece 9.

However, the image pick-up device of the invention is not necessarily applied to the image measurement apparatus 1 according to the above exemplary embodiment. For instance, in some embodiments, the image pick-up device is installed in an image inspection device, or is applied to a microscope for measuring a micro workpiece, a monitor of a micro-profile measurement system using a micro stylus, a hardness measuring machine, or in-line inspection in a manufacturing process.

In the above exemplary embodiment, the displacement-detecting optical head 20, the displacement-detection lens controller 40, and the personal computer 50 (the profile measurement processor 53 and the profile-measurement lens operation unit 54) define the non-contact displacement-detecting device of the invention for the profile measurement of the surface of the workpiece 9.

However, the non-contact displacement-detecting device of the invention is not necessarily applied to the image measurement apparatus 1 according to the above exemplary embodiment, but is applied to various devices for the position detection of the surface, the displacement detection or the profile measurement of the workpiece in some embodiments. In such a case, existing LAF, TAF and CPS, or PFF and WLI are applicable to the optical structure and the image processing for the displacement measurement.

What is claimed is:

1. An image measurement apparatus comprising:
a first image sensor configured to detect a first image of a workpiece;

a first variable focal length liquid lens unit disposed on a first optical path extending from the workpiece to the first image sensor, the first variable focal length liquid lens unit comprising:
   a first case filled with a first transparent liquid; and
   a first cylindrical vibrator formed of a first piezoelectric material;
a first controller configured to control the first variable focal length liquid lens unit and process the first image detected by the first image sensor;
a stage on which the workpiece is placed;
a display device configured to display the first image detected by the first image sensor on the display device; and
a non-contact displacement-detecting device comprising:
   a second image sensor configured to detect a second image of the workpiece;
   a second variable focal length liquid lens unit disposed on a second optical path extending from the workpiece to the second image sensor, the second variable focal length liquid lens unit comprising:
     a second case filled with a second transparent liquid; and
     a second cylindrical vibrator formed of a second piezoelectric material; and
   a second controller configured to control the second variable focal length liquid lens unit and detect a surface position of the workpiece from the second image detected by the second image sensor.

2. A non-contact displacement-detecting device comprising:

a first image sensor configured to detect a first image of a workpiece;
a first variable focal length liquid lens unit disposed on a first optical path extending from the workpiece to the first image sensor, the first variable focal length liquid lens unit comprising:
   a first case filled with a first transparent liquid; and
   a first cylindrical vibrator formed of a first piezoelectric material;
a first controller configured to:
   control the first variable focal length liquid lens unit,
   detect a surface position of the workpiece from the first image detected by the first image sensor, and
   measure a surface profile of the workpiece;
a stage on which the workpiece is placed;
a display device configured to display a detection result thereon; and
an image measurement apparatus comprising:
   a second image sensor configured to detect a second image of the workpiece;
   a second variable focal length liquid lens unit disposed on a second optical path extending from the workpiece to the second image sensor, the second variable focal length liquid lens unit comprising:
     a second case filled with a second transparent liquid; and
     a second cylindrical vibrator formed of a second piezoelectric material; and
   a second controller configured to control the second variable focal length liquid lens unit and process the second image detected by the second image sensor.

* * * * *